Oct. 11, 1932.    A. B. MUELLER    1,882,293
CAMERA BACK AND NEGATIVE FRAME
Filed Feb. 6, 1930    6 Sheets-Sheet 4
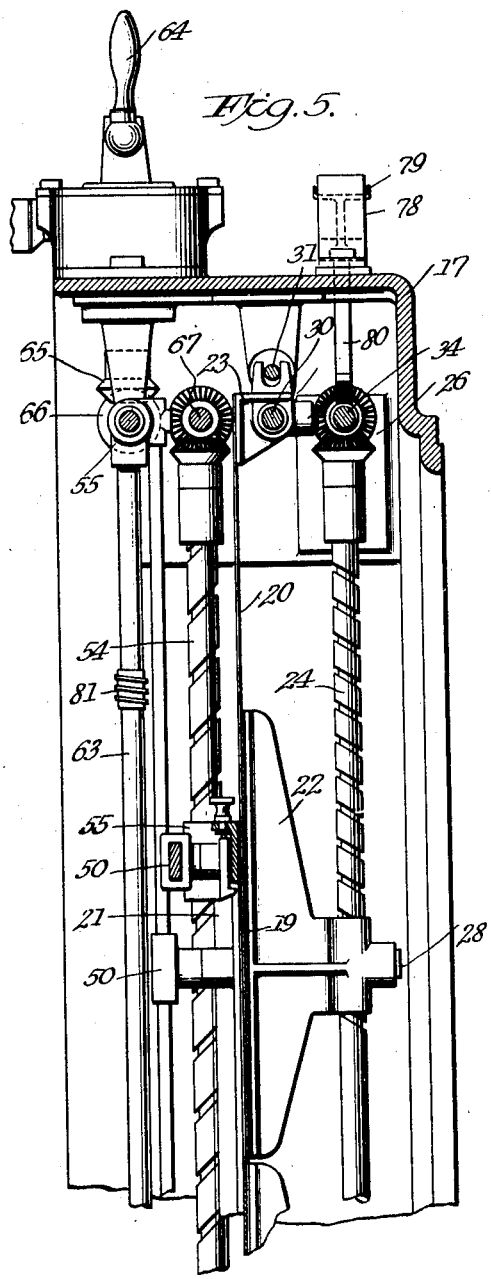
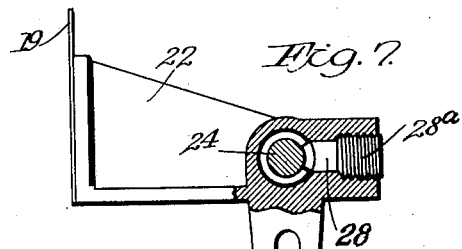
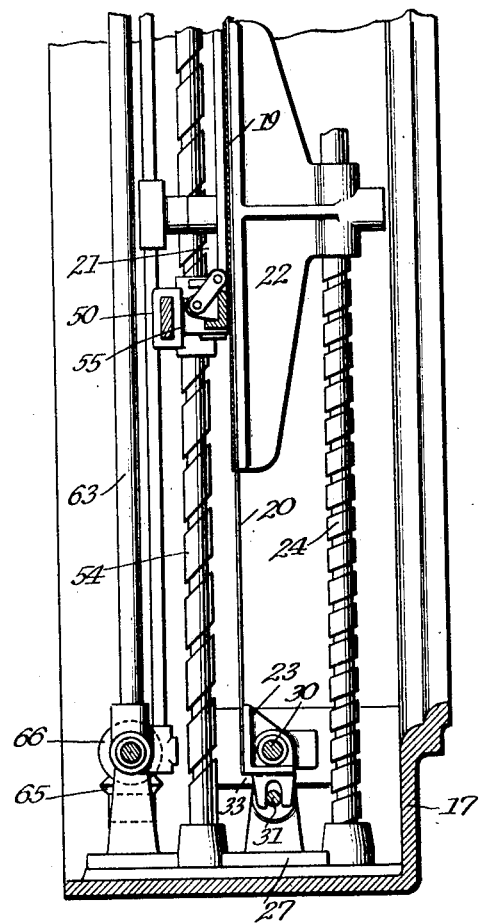
Inventor
Albert B. Mueller
By Emery, Booth, Varney & Holcomb
his Attorneys

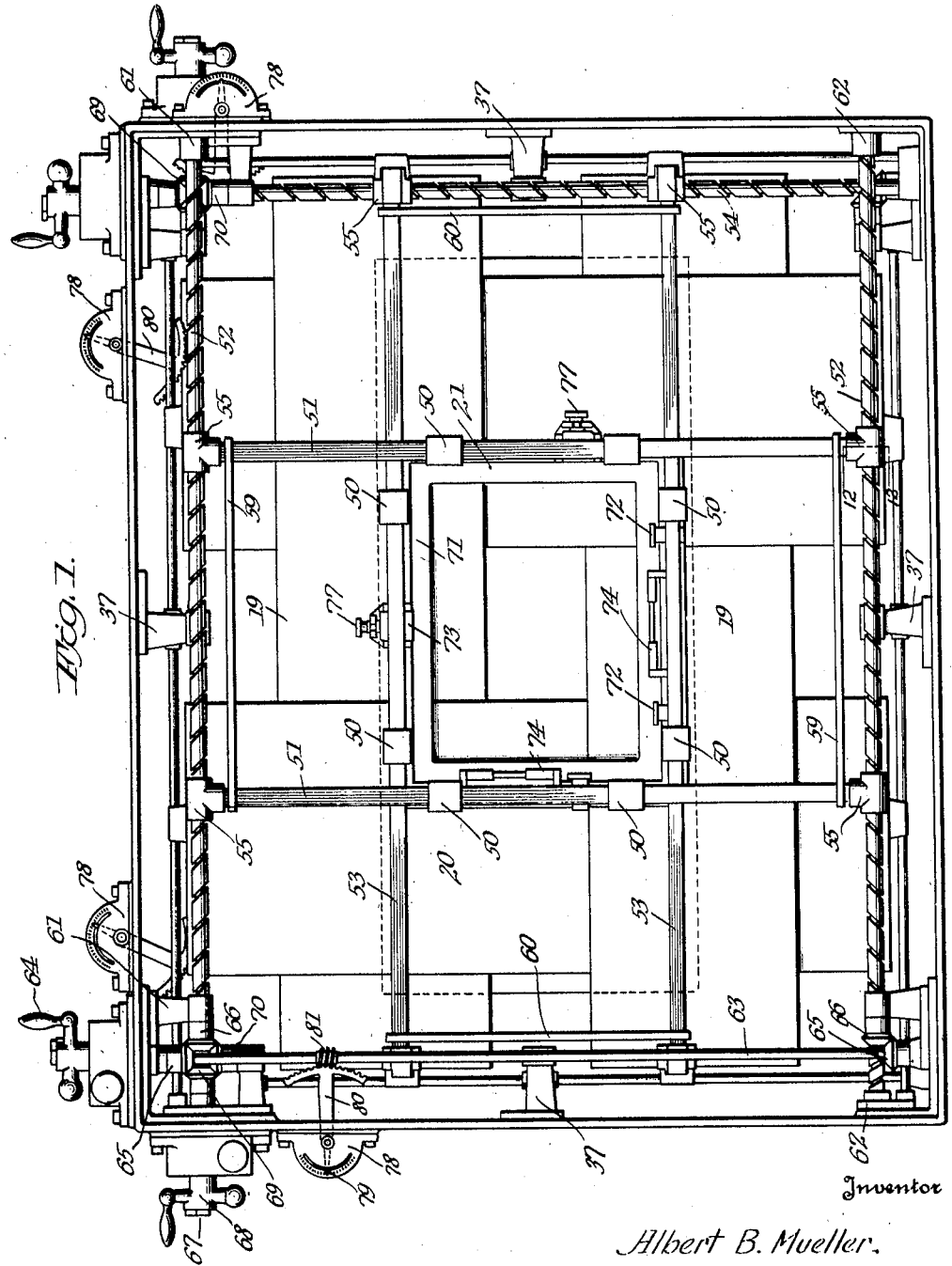

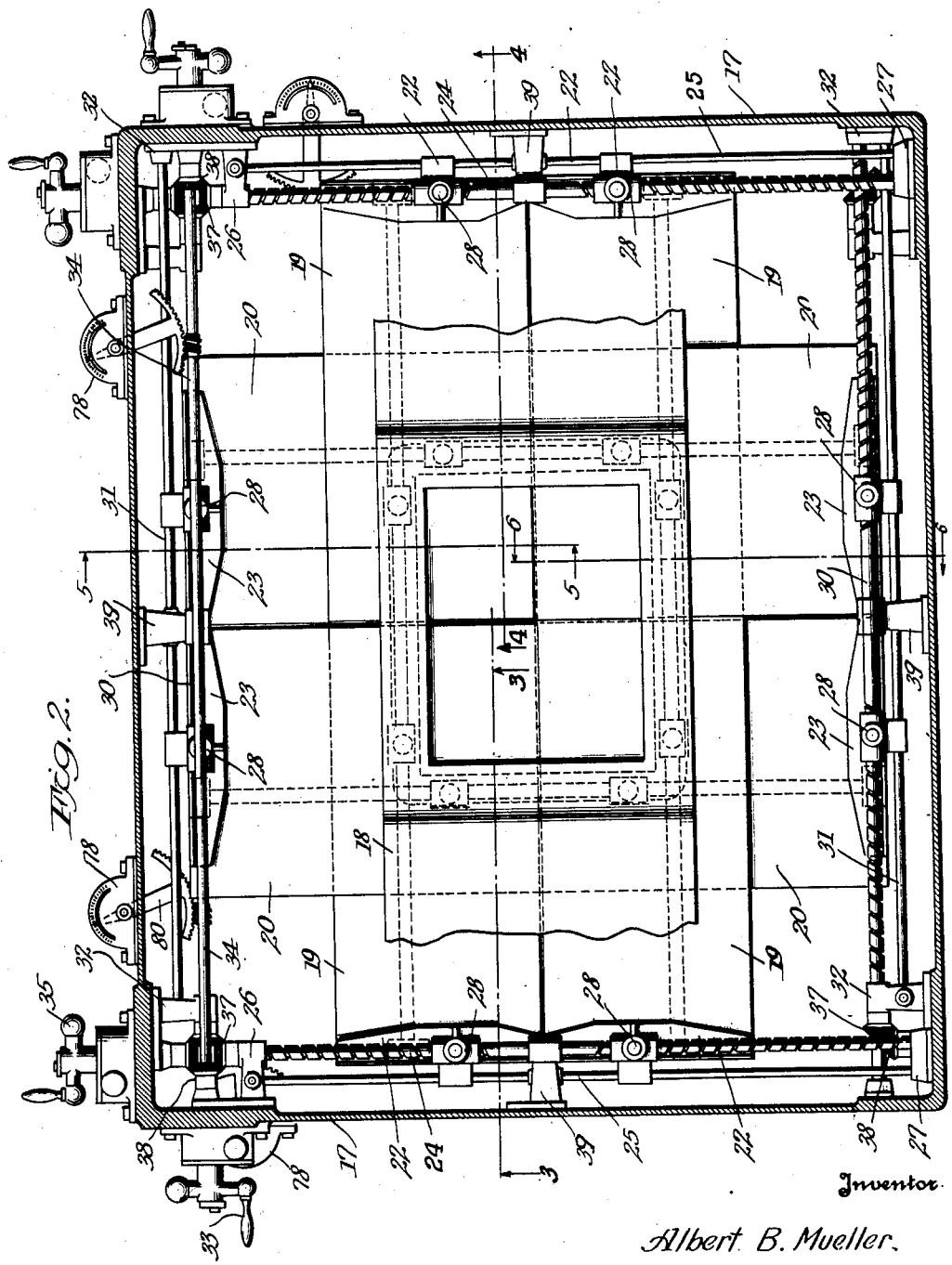

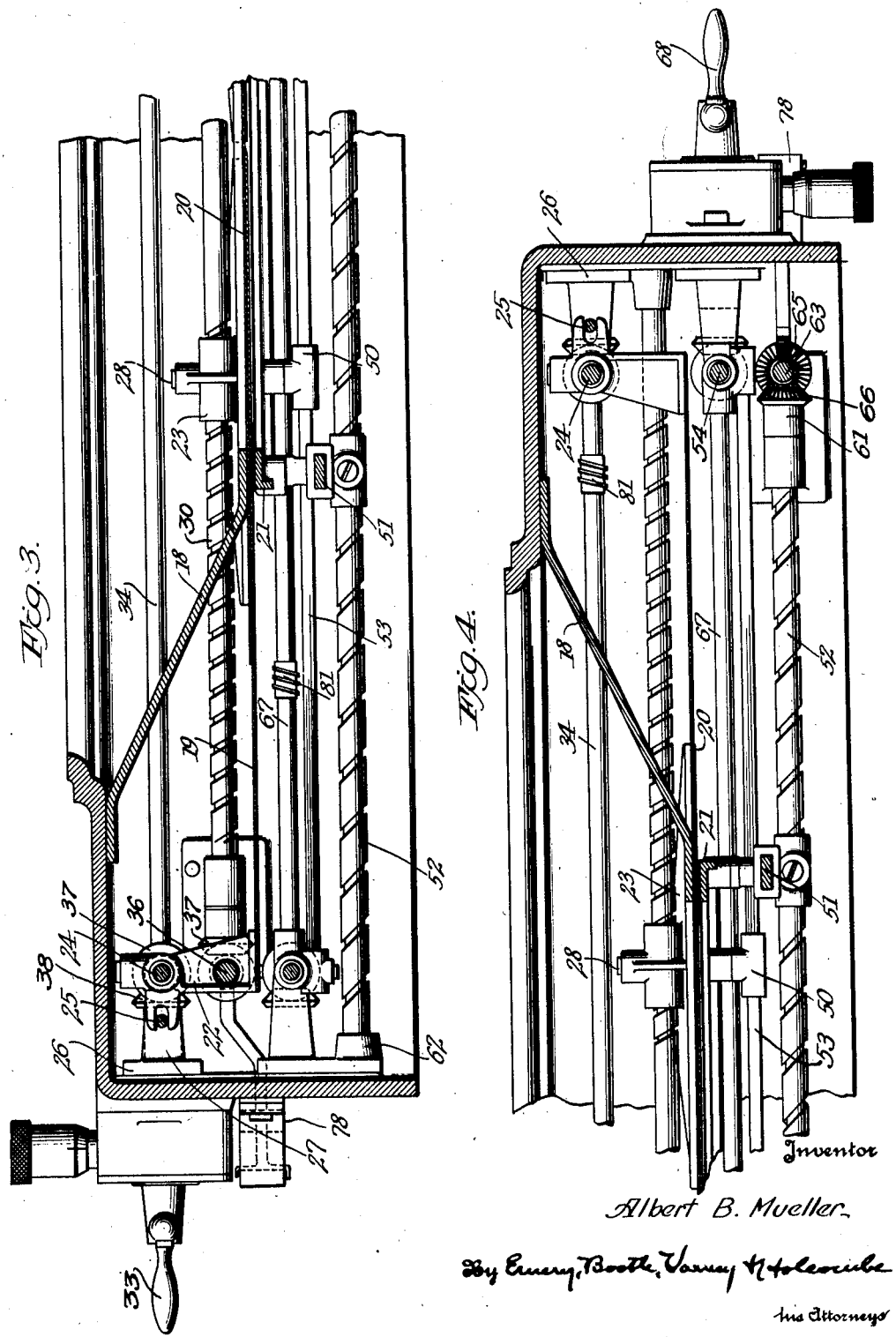

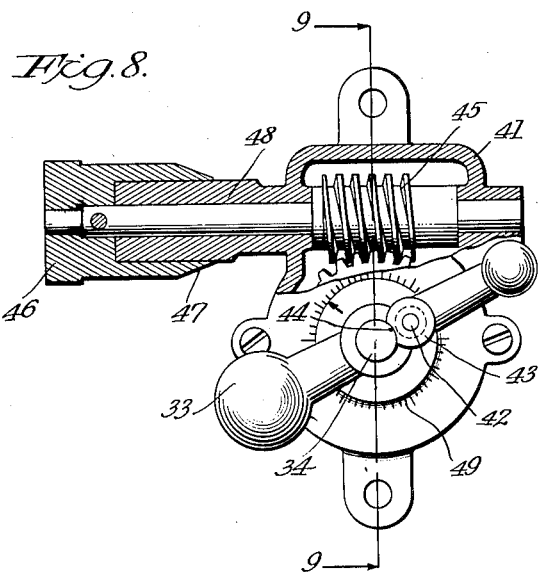
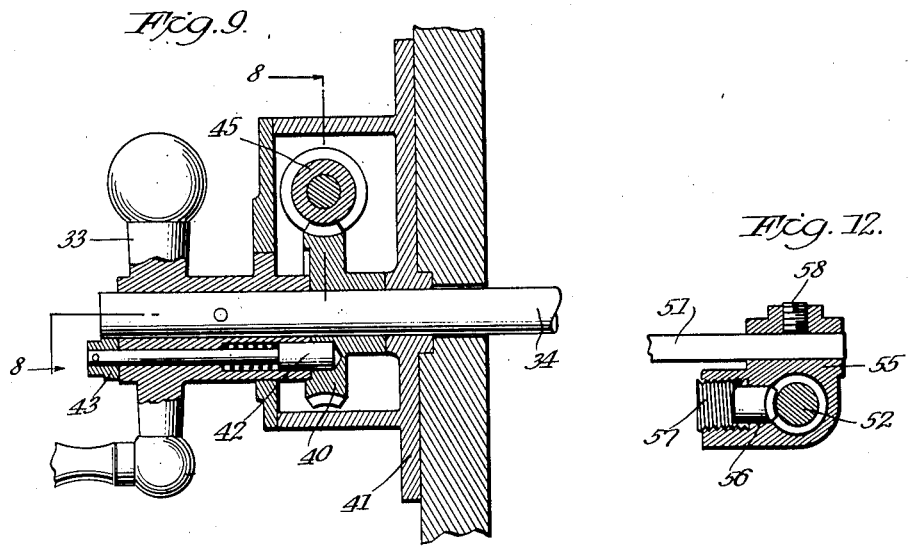

Oct. 11, 1932.  A. B. MUELLER  1,882,293

CAMERA BACK AND NEGATIVE FRAME

Filed Feb. 6, 1930  6 Sheets-Sheet 6

Inventor

Albert B. Mueller.

By Emery, Booth, Varney & Holcombe his Attorneys

Patented Oct. 11, 1932

1,882,293

UNITED STATES PATENT OFFICE

ALBERT B. MUELLER, OF CHICAGO, ILLINOIS, ASSIGNOR, BY MESNE ASSIGNMENTS, TO GARDNER ABBOTH, AS TRUSTEE

CAMERA BACK AND NEGATIVE FRAME

Application filed February 6, 1930. Serial No. 426,421.

This invention relates to negative frames and holders for cameras of the step and repeat or multiplying type, and which may be used on separating cameras known to the lithographing art, although not restricted thereto.

The invention aims to provide rigid but readily adjustable means for holding a negative or other image in any one of a plurality of positions for projecting a number of like images upon one or more plates or screens in any desired position or arrangement, and for quickly substituting other negatives or images therefor in any desired operating position.

Further aims and advantages of the invention appear in connection with the following description of the illustrative embodiment thereof shown in the accompanying drawings, wherein Fig. 1 is a view from the rear of the camera, showing the negative frame in elevation;

Fig. 2 is a vertical transverse cross-section through the camera back in front of the negative frame and mask, looking toward the rear;

Figs. 3 and 4 are horizontal cross-sections of the same drawn to a larger scale, on the lines 3—3 and 4—4 respectively, in Fig. 2, looking in the direction of the arrows, and showing the adjusting means for the mask at the left in Fig. 3 and for the negative frame at the right in Fig. 4;

Figs. 5 and 6 are vertical cross-sections of the same on the lines 5—5 and 6—6, respectively in Fig. 2, looking in the direction of the arrows and drawn to the same scale as Figs. 3 and 4;

Fig. 7 is a cross-section through a mask holder slide, taken on the line 7—7 in Fig. 6 drawn to a larger scale;

Fig. 8 is a part side elevation and part cross-section on the line 8—8 in Fig. 9 of a micrometer adjustment and securing device suitable for the masks and negative frame adjusting and holding shafts;

Fig. 9 is a cross-section of the same on the line 9—9 in Fig. 8 drawn to the same scale;

Fig. 12 is a cross-section of a negative frame slide rod nut on the line 12—12 in Fig. 3, drawn to a larger scale.

Figure 10:
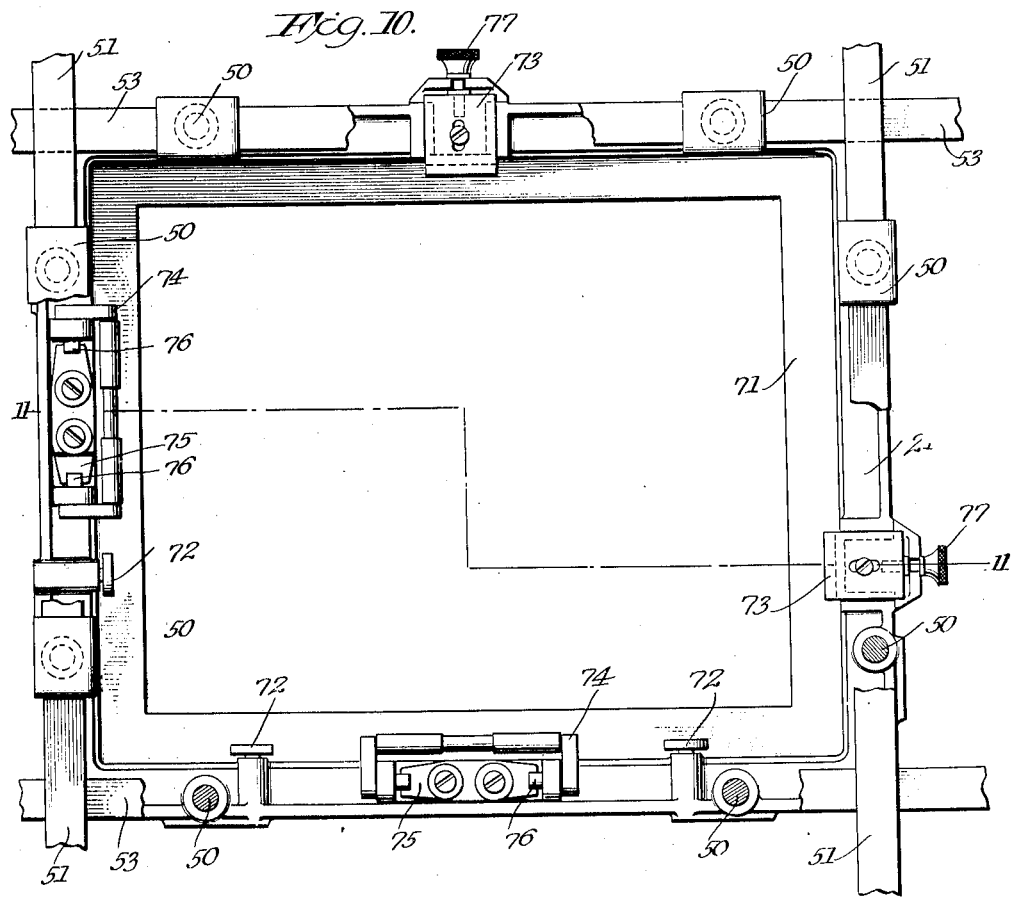
Fig. 10 is a rear view of the negative frame, drawn to the same scale as Figs. 3 to 6, inclusive.

In the illustrative embodiment of the invention shown in the drawings, the camera back frame 17 is preferably made of cast aluminum or other light rigid material, to which the various parts of the mechanism may be securely attached. The frame is partly closed by the rigid mask member 18 against which the adjustable mask plates 19, 20, and negative frame 21 may readily be positioned. The horizontal and vertical mask plates are rigidly fastened at their ends to slides 22, 23, mounted for movement parallel to each side of the frame. The slides 22 that carry the horizontal mask plates 19 are supported upon a pair of right and left threaded screw rods 24 and guide bars 25. The screw rods are rotatably journaled at their ends in suitable brackets 26, 27, which also support the guide bars 25. The slides 22 are provided with plug nuts 28 held in position by screws 28ª for engaging the right and left screw threaded rods 24 (see Fig. 7). The vertical mask plates 20 are similarly mounted on horizontal screw rods 30 and guide bars 31 supported at their ends in brackets 32, as shown in Figs. 2 to 7, inclusive. The horizontal mask plates are adjusted by the handle 33 on the end of the adjusting shaft 34, and the vertical mask plates are adjusted by the handle 35 on the adjusting shaft 36, so that the mask plates of each pair may be moved towards and away from each other, depending on which way the adjusting shafts are turned. The screw rods of each pair are fitted at their corresponding ends with angle gears 37 meshing with similar angle gears 38 on one or the other of the adjusting shafts 34, 36. Middle bracket supports 39 are provided for holding the screw rods 24, 30 and guide bars 25, 31 intermediate their ends to prevent undue flexure of these members.

The horizontal shaft 34 controlling the position of the horizontal mask plates 19, and the vertical shaft 36 controlling the position of the vertical mask plates 20, as shown in Fig. 2, may be adjusted very accurately by means of the micrometer adjustment shown in Figs. 8 and 9, illustrating the application of the micrometer mechanism to the horizontal shaft 34. As shown, the shaft 34 carries a worm wheel 40 mounted loosely upon it between the handle 33 and the bearing for the shaft in the enclosing casing 41, which worm wheel may be locked to the shaft by a spring pressed pin 42 carried in the hub of the handle 33, and adapted to engage normally in a hole in the worm wheel. The outer end of the locking pin 42 carries a button 43 having an arcuate recess 44 fitting against the projecting end of the shaft 34, so that after pulling out the pin the button may be turned to rest upon the end of the shaft to hold the pin out of engagement with the hole in the worm wheel 40.

A micrometer screw 45 mounted in the casing 41 engages the worm wheel and holds it in set position at all times. The shaft of the micrometer screw projects from the casing and carries a cap 46 for rotating it. The cap is provided with a sleeve bearing a beveled graduated scale 47 for indicating the angular position of the cap and screw with reference to an axial line marked on the outside of the stem portion 48 of the casing 41.

A scale 49 on the cover of the casing 41 and a cooperating index mark on the hub of the respective handles 33, 35, serve to indicate the angular position of the operating shafts 34, 36 and assist in determining the setting of the mask plates 19, 20. For convenience these scales 49 and the micrometer screw scales are graduated to measure to hundredths and thousandths of an inch, respectively, the movement of the mask plates.

The negative holder consists of an aluminum frame 21 slidably supported by pivoted lugs 50 on flexible movable bars arranged in pairs, the vertical bars 51 being movable horizontally on the top and bottom horizontal screw rods 52, and the horizontal bars 53 being movable vertically on the side vertical screw rods 54, as clearly shown in Fig. 1. The slides 55 that support the ends of the guide bars 51, 53 on the screw rods 52, 54 are shown in detail in Fig. 12. In the form shown, the nut 56 that engages the screw thread in the rod 52 is secured in place by a screw 57, and the slide is secured upon the ends of the bar 51 by a set screw 58. Bars 59 connect the ends of the bars 51 adjacent to the slides 55 to stiffen the sliding frame thereby formed. Similar bars 60 connect the ends of the bars 53.

The ends of the screw rods 52 that support the upper and lower ends of the slide bars 51 are journaled in suitable brackets 61, 62, secured within the main frame 17. A vertical actuating shaft 63, controlled by a handle 64 on the top of the frame 17, is connected to the horizontal screw rods 52 by means of angle gears 65, 66, for rotating said rods simultaneously to shift the negative frame 21 horizontally in either direction.

A similar actuating shaft 67 controlled by a handle 68 on the outside of the frame 17 actuates the screw rods 54 by means of angle gears 69, 70, to move the negative frame vertically. The handles 64, 68, may be equipped with micrometer attachments and indicating scales like those provided for the mask adjusting shafts.

Figure 11:
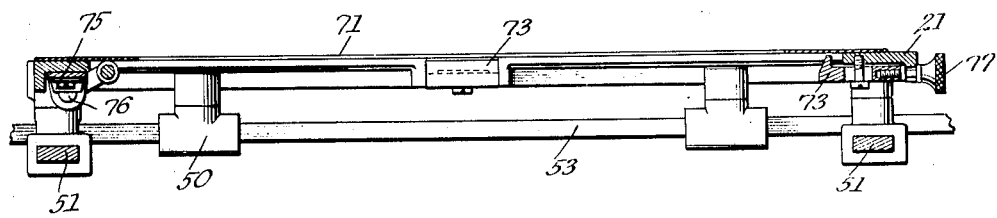
Fig. 11 is a horizontal cross-section of the same on the line 11—11 in Fig. 10.

The negative frame 21 has a thin sheet metal mask 71 to suit the size of the negative, and the latter is positioned and held in place against the mask by fixed stops 72 in the bottom and on one side and movable latches 73 in the top and other side, as shown in Figs. 10 and 11. Each latch 73 is beveled slightly on its end that engages the negative to hold the latter against the mask 71, spring pressed rocker arms 74 preferably faced with rubber bear against the negative on the opposite edges to hold it against the mask 71. The rocker arms are retained by flat springs 75 which bear against flattened segments on the pivots 76 that support the arms, as best shown in Fig. 11. The sliding latches 73 are adjusted by thumb screws 77 to secure the negative after it has been inserted behind the rocker arms.

From the foregoing description it is obvious that the negative will be rigidly held in the negative frame flat against the mask 71 in one position, determined by its edges engaging the stops 72, and the negative frame in turn will be held flat against the movable mask plates 19, 20, and fixed mask 18 by the resiliency of its supporting bars 51, 53, thereby insuring that the negative will be maintained in the focal plane of the camera whatever may be its adjusted position vertically and horizontally.

Moreover, the negative may be removed and replaced by another without disturbing the setting of the negative frame. Furthermore, any desired portion of a negative may be masked to any size desired by moving the mask plates and negative holder, and the same identical portion will be masked on all plates of a set if the setting be maintained by locking the actuating handles to the micrometer screws. Indicating devices 78 may be provided for showing the positions of the negative holder and masks. Each device preferably comprises an index pointer 79, mounted on a pivoted sector 80, so as to move over an appropriately graduated scale, and connected to the corresponding control shaft 34, 36, 65, or 67 by suitable gearing, such as a worm 81. These features are advantageous in making composite plates by projection from a plurality of sets of negatives.

Other uses and advantages of the invention will occur to those skilled in the photographic and photolithographic arts.

The invention is not restricted to the details of construction of the embodiment shown in the drawings, but what is claimed is as follows:

1. A camera back comprising a main frame, mask plates mounted in pairs for simultaneous movement in opposite directions, the plates of each pair being parallel to each other and movable at right angles to the plates of the other pair, a rigid mask frame secured to said main frame on the front side of said mask plates, and a rigid negative frame movably secured to said main frame on the rear side of said mask plates.

2. A camera back comprising a main frame, mask plates mounted in pairs for simultaneous movement in opposite directions, the plates of each pair being parallel to each other and movable at right angles to the plates of the other pair, a rigid mask frame secured to said main frame on the front side of said mask plates, parallel guide bars having their ends slidably supported on said main frame, and a rigid negative frame movably secured to said guide bars on the rear side of said mask plates.

3. A camera back comprising a main frame, mask plates mounted in pairs for simultaneous movement in opposite directions, the plates of each pair being parallel to each other and movable at right angles to the plates of the other pair, a rigid mask frame secured to said main frame on the front side of said mask plates, pairs of guide bars having their ends slidably supported on said main frame, the bars of each pair being parallel and movable in the same direction at right angles to the bars of the other pair, and a rigid negative frame movably secured to said guide bars on the rear side of said mask plates.

4. A camera back comprising a main frame, mask plates mounted in pairs for simultaneous movement in opposite directions, the plates of each pair being parallel to each other and movable at right angles to the plates of the other pair, a rigid mask frame secured to said main frame on the front side of said mask plates, and a rigid negative frame movably secured to said main frame on the rear side of said mask plates, the supporting means for said negative frame being resilient and tending to hold said negative frame and mask plates against said mask frame to prevent vibration.

5. A camera back comprising a main frame, flexible mask plates mounted in pairs for simultaneous movement in opposite directions, the plates of each pair being parallel to each other and movable at right angles to the plates of the other pair, a rigid mask frame secured to said main frame on the front side of said mask plates, flexible supports movably secured to said main frame, and a rigid negative frame movably secured to said supports on the rear side of said mask plates, the supporting means for said negative frame tending to hold said negative frame and mask plates against said mask frame to prevent vibration.

6. A camera back comprising a main frame, mask plates mounted in pairs for simultaneous movement in opposite directions, the plates of each pair being parallel to each other and movable at right angles to the plates of the other pair, a rigid mask frame secured to said main frame on the front side of said mask plates, pairs of guide bars having their ends slidably supported on said main frame, the bars of each pair being flexible and movable in the same direction at right angles to the bars of the other pair, and a rigid negative frame movably secured to said guide bars on the rear side of said mask plates, whereby said negative frame is movably and resiliently held in engagement with said mask plates and mask frames.

7. A camera back comprising a main frame, mask plates arranged in pairs in said frame, the plates of each pair being parallel to each other and at right angles to the plates of the other pair, fixed guides for the ends of said respective pairs of plates, screw rods mounted in said frame parallel to said guides, said screw rods having right and left threads, and means on said screw rods respectively engaging said right and left threads and secured to said plates to cause the ends thereof to move in the same direction.

8. A camera back comprising a main frame, mask plates arranged in pairs in said frame, the plates of each pair being parallel to each other and at right angles to the plates of the other pair, fixed guides for the ends of said respective pairs of plates, screw rods mounted in said frame parallel to said guides, said screw rods having right and left threads, and means on said screw rods respectively engaging said right and left threads and secured to said plates to cause the ends thereof to move in the same direction, independent rotating means for each screw shaft, and means for individually controlling the positions of said rotating means.

9. A camera back comprising a main frame, mask plates arranged in pairs in said frame, the plates of each pair being parallel to each other and at right angles to the plates of the other pair, fixed guides for the ends of said respective pairs of plates, screw rods mounted in said frame parallel to said guides, said screw rods having right and left threads, and means on said screw rods respectively engaging said right and left threads and secured to said plates to cause the ends thereof to move in the same direction, independent rotating means for each screw shaft, and means for individually controlling the positions of said rotating means, said controlling means comprising a worm wheel and worm for locking it in rotated position.

10. A camera back comprising a main frame, mask plates arranged in pairs in said frame, the plates of each pair being parallel to each other and at right angles to the plates of the other pair, fixed guides for the ends of said respective pairs of plates, screw rods mounted in said frame parallel to said guides, said screw rods having right and left threads, and means on said screw rods respectively engaging said right and left threads and secured to said plates to cause the ends thereof to move in the same direction, independent rotating means for each screw shaft, and means for individually controlling the positions of said rotating means, said controlling means comprising a worm wheel and worm for locking it in rotated position, and a detachable connection between said worm wheel and rotating means.

11. A negative holder for a camera comprising a frame and a front wall, positioning elements fast upon two adjoining edges of said frame against which two adjacent edges of the negative may abut, latch elements upon the sides of said frame opposite said positioning elements, said latch elements being beveled to engage the corresponding edges of the negative and press them against said positioning elements and front wall, and spring means for engaging the back of the negative near its edges abutting against said stops to press said edges against said front wall.

12. A negative holder for a camera comprising a frame and a front wall, positioning elements fast upon two adjoining edges of said frame against which two adjacent edges of the negative may abut, latch elements upon the sides of said frame opposite said positioning elements, said latch elements being beveled to engage the corresponding edges of the negative and press them against said positioning elements and front wall, and means for engaging the back of the negative near its edges abutting against said stops to press said edges against said front wall, said engaging means including an arm pivotally mounted on said frame and a spring secured to said frame and engaging the pivot portion of said arm.

13. A negative holder for a camera comprising a frame and a front wall, positioning elements fast upon two adjoining edges of said frame against which two adjacent edges of the negative may abut, and means for engaging the back of the negative near its edges abutting against said stops to press said edges against said front wall, said engaging means including an arm pivoted in a lug on said frame, the pivot portion of said arm projecting through said lug and having a flattened side, and a flat spring secured to said frame and having an end engaging said flattened side of said pivot portion to resist turning of said pivot in the direction to permit said arm to move away from the front wall of said negative holder.

14. In a camera back for projecting cameras, a negative holder and non-vibratory supporting means therefor comprising a rigid wall having an opening, movable mask plates adjacent said opening, and transverse guides parallel to said mask plates and movable independently thereof, said negative holder being slidable upon said guides.

15. In a camera back for projecting cameras, a negative holder and non-vibratory supporting means therefor comprising a rigid wall having an opening, movable mask plates adjacent said opening, transverse guides parallel to said mask plates and movable independently thereof, said negative holder being slidable upon said guides, and supports for said guides for holding said negative frame against said mask plates and rigid wall.

16. A camera back comprising a main frame, pairs of parallel mask plates mounted on screw rods for simultaneous movement, means for rotating and adjusting said rods, and means for securing said rods in adjusting position comprising a worm wheel mounted for rotation on said rods, an axially movable pin carried by said rods and adapted to engage said worm wheel for locking said wheel against rotation with respect to said rods and a non-reversible worm engaging said worm wheel.

17. A camera back comprising a main frame, pairs of parallel mask plates mounted on screw rods for simultaneous movement, means for rotating and adjusting said rods, and means for securing said rods in adjusted position comprising a worm wheel mounted for rotation on said rods, an axially movable pin carried by said rods and adapted to engage said worm wheel for locking said wheel against rotation with respect to said rods, a spring for holding said pin in engagement with said worm wheel, and a non-reversible worm engaging said worm wheel.

18. A camera back comprising a main frame, pairs of parallel mask plates mounted on screw rods for simultaneous movement, means for rotating and adjusting said rods, and means for securing said rods in adjusting position comprising a worm wheel mounted for rotation on said rods, an axially movable pin carried by said rods and adapted to engage said worm wheel for locking said wheel against rotation with respect to said rods, a spring for holding said pin in engagement with said worm wheel, a notched flange on said pin and means normally entering said notch when said pin engages the worm wheel, for holding said pin out of engagement with said worm wheel when said pin is withdrawn and turned to present an unnotched portion of said flange thereto, and a non-reversible worm engaging said worm wheel.

In testimony whereof, I have signed my name to this specification.

ALBERT B. MUELLER.

CERTIFICATE OF CORRECTION.

Patent No. 1,882,293.                                October 11, 1932.

ALBERT B. MUELLER.

It is hereby certified that the name of the trustee in the above numbered patent was erroneously described and specified as "Gardner Abboth" whereas said name should have been described and specified as "Gardner Abbott", as shown by the records of assignments in this office; page 2, line 87, before "spring" insert the word "and"; and that the said Letters Patent should be read with these corrections therein that the same may conform to the record of the case in the Patent Office.

Signed and sealed this 31st day of January, A. D. 1933.

M. J. Moore,
Acting Commissioner of Patents.

(Seal)